United States Patent
Dutta

(10) Patent No.: US 12,126,524 B2
(45) Date of Patent: Oct. 22, 2024

(54) U-TURN INDICATOR IN INTERNET PROTOCOL PACKETS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/030,667

(22) Filed: Sep. 24, 2020

(65) Prior Publication Data

US 2022/0094631 A1    Mar. 24, 2022

(51) Int. Cl.
| | |
|---|---|
| *H04L 45/28* | (2022.01) |
| *H04L 41/0668* | (2022.01) |
| *H04L 45/02* | (2022.01) |
| *H04L 45/12* | (2022.01) |
| *H04L 45/745* | (2022.01) |
| *H04L 69/22* | (2022.01) |

(52) U.S. Cl.
CPC .......... *H04L 45/28* (2013.01); *H04L 41/0668* (2013.01); *H04L 45/12* (2013.01); *H04L 45/745* (2013.01); *H04L 69/22* (2013.01); *H04L 45/02* (2013.01)

(58) Field of Classification Search
CPC ..... H04L 45/28; H04L 41/0668; H04L 45/12; H04L 45/745; H04L 69/22
See application file for complete search history.

(56) References Cited

U.S. PATENT DOCUMENTS

| | | | |
|---|---|---|---|
| 9,692,687 B2 | 6/2017 | Kimpella et al. | |
| 2006/0013127 A1* | 1/2006 | Izaiku | H04L 45/50 370/242 |

(Continued)

FOREIGN PATENT DOCUMENTS

CN    103444139 A    12/2013

OTHER PUBLICATIONS

Atlas, et al., U-turn Alternates for IP/LDP Fast-Reroute draft-atlas-ip-local-protect-uturn-03, Feb. 2026 (Year: 2006).*

(Continued)

*Primary Examiner* — William G Trost, IV
*Assistant Examiner* — Monishwar Mohan
(74) *Attorney, Agent, or Firm* — Tong, Rea, Bentley & Kim, LLC

(57) ABSTRACT

A network includes a first node having a processor that incorporates a U-turn indicator into a header of an Internet protocol (IP) packet for transmission along a first path towards a second node. The U-turn indicator indicates that the first node expects to receive the IP packet back from the second node. The first node also includes a transceiver that transmits the IP packet including the header having the U-turn indicator along the first path. In some cases, the transceiver (or another transceiver in another node) receives a packet comprising a U-turn indicator. The processor (or another processor in another node) detects the U-turn indicator in a header of the IP packet. The processor forwards the IP packet along a path to a destination node that does not include the node that originally transmitted the IP packet or drops the IP packet depending on whether an alternate path is identified.

22 Claims, 12 Drawing Sheets

(56) References Cited

U.S. PATENT DOCUMENTS

| | | | | |
|---|---|---|---|---|
| 2008/0107018 A1* | 5/2008 | Zhang | ................ | H04L 12/1877 370/228 |
| 2011/0007629 A1* | 1/2011 | Atlas | ....................... | H04L 45/00 370/225 |
| 2011/0286384 A1* | 11/2011 | Sugimoto | ............. | H04W 80/04 370/328 |
| 2012/0236860 A1* | 9/2012 | Kompella | ............... | H04L 45/28 370/392 |
| 2015/0109902 A1* | 4/2015 | Kumar | .................... | H04L 45/22 370/219 |

OTHER PUBLICATIONS

"Internet Protocol, DARPA Internet Program, Protocol Specification", RFC 791, Sep. 1981, 49 pages.

"Internet Protocol Version 4 IPv4 Parameters", May 3, 2018, 3 pages.

"Internet Protocol Version 6 (IPv6) Parameters", Apr. 20, 2020, 5 pages.

Deering et al, "Internet Protocol, Version 6 (IPv6) Specification", Network Working Group, RFC 2460, Dec. 1998, 39 pages.

Atlas et al, "Basic Specification for IP Fast Reroute: Loop-Free Alternates", Network Working Group, RFC 5286, Sep. 2008, 31 pages.

Reynolds et al, "Assigned Numbers", Network Working Group, RFC 1700, Oct. 1994, 230 pages.

Raj. A. et al., "A survey of IP and multiprotocol label switching fast reroute schemes," Computer Networks: The International Journal of Computer and Telecommunications Networking, vol. 51, Issue 8, Jun. 2007, pp. 1882-1907.

Extended Search Report mailed in corresponding EP 21198098.2 dated Feb. 15, 2022, 16 pages.

Communication pursuant to Article 94(3) EPC, Application No. 21 198 098.2-1215, Apr. 15, 2024; pp. (8).

Xiaowei Yang, David Wetherall, "Source Selectable Path Diversity via Routing Deflections", University of California, University of Washington; SIGCOMM'06, Sep. 11-15, 2006, Copyright 2006 ACM, pp. (12).

Office Action, Chinese Application No. 2021111056782, May 7, 2024; pp. (2).

* cited by examiner

U-TURN INDICATOR IN INTERNET PROTOCOL PACKETS

BACKGROUND

Networks that operate according to the Internet Protocol (IP) include nodes such as routers that forward packets over corresponding links between the nodes. The nodes have forwarding tables (or routing tables) that include information that is used to typically forward packets based on destination information included in IP headers of the packets. This is the default mode of forwarding of IP packets, which is referred to herein as "destination-based routing." Although the nodes and links are generally reliable, forwarding of packets can be disrupted by link failures, node failures, errors in the forwarding tables, and the like. The effects of outages are reduced in some cases by computing alternate paths that are used in the event of errors or failures. For example, fast rerouting techniques are used to forward IP packets along precomputed loop free alternate (LFA) paths without incurring loss during a period of outage using redundancy in the IP network to provide the LFA paths through the network. In response to detecting a link failure, the IP network reruns a shortest path algorithm for the routing protocol assuming that the failed link does not exist, which produces an alternate path that bypasses the failed link and allows the network to resume forwarding traffic (if there was no LFA path for fast rerouting) or redirecting traffic from the LFA path to the new alternate path (if packets are being fast rerouted through LFA path after the failure). Examples of routing protocols that support fast rerouting include the Interior Gateway Protocols (IGPs) such as IP networks that operate according to the Intermediate System to Intermediate System (IS-IS) routing protocol, the Open Shortest Path First (OSPF, OSPFv3) protocols, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
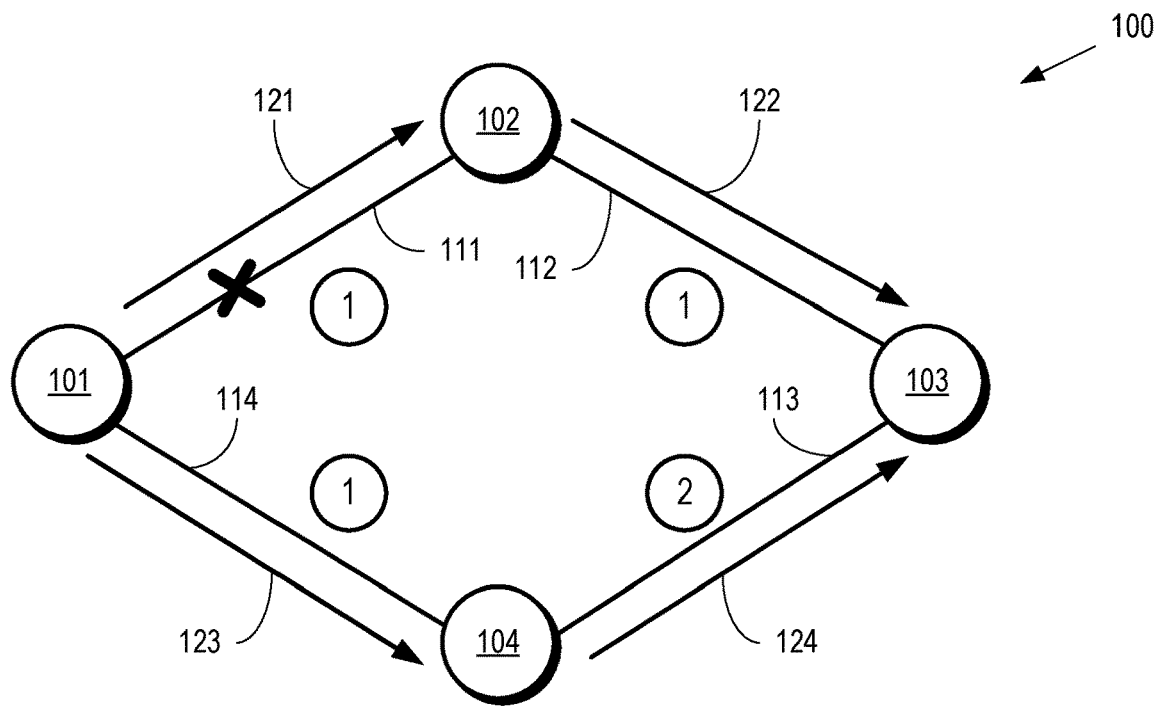
FIG. 1 is a block diagram of an Internet Protocol (IP) network that implements fast rerouting using precomputed alternate paths according to some embodiments.

Link failures or other outages in an IP network that block communication between nodes via a link create the potential for "U-turn" routing. For example, a U-turn occurs if a forwarding table at a first node forwards a packet towards a second node and the forwarding table at the second node directs the packet back to the first node. In some network topologies, there is no LFA path from a source node to a destination node that can be used for fast rerouting. A potential LFA path from the source node to the destination node may not be available if an intermediate node does not have a link that allows it to connect to the destination node, except via a U-turn path that returns to the source node, which is not permitted in conventional LFA path computations. As another example, if the network forwards packets along an LFA path in response to a link failure along the primary path, a second U-turn path can be created if a link along the LFA path fails concurrently with the link failure along the primary path. As yet another example, a transient loop can occur in response to a topology change before convergence of the shortest path algorithm at the nodes in the network. The topology change can create loops including multiple U-turns prior to convergence of the shortest path algorithm. The loops typically resolve in response to convergence of the shortest path algorithm, although the convergence time can be significant and grows with the size of the network.

FIGS. 1-15 disclose techniques for preventing loops in IP networks by incorporating U-turn indicators into the headers of packets that are forwarded over links that are associated with U-turns in a network topology. A U-turn indicator includes a destination address of a destination node for the packet, one or more flags, and in some embodiments an address of a node (referred to herein as an "originating node" or an "originator") that added the U-turn indicator to the header of the packet. The originating node incorporates the U-turn indicator into the header of packets associated with routes that include a U-turn path. The U-turn indicator therefore indicate that the originating node expects another node to forward the packet back towards the originating node. In some embodiments, the originating node includes an entry in a routing table for an alternate path that is tagged as a U-turn path because a second node along the alternate path is expected to forward packets back to the originating node. In response to a failure along a primary path, the originating node reroutes the packet along the alternate path and incorporates a U-turn indicator into a header of the packet.

In some embodiments, the originating node receives a packet from another node and decides to forward the packet back to the node. The originating node incorporates a U-turn indicator into the header of the packet before returning the packet to the node that previously transmitted the packet to the originating node. For example, an originating node can include routing tables that are configured to support an alternate path from a first node to a destination in response to failure of the primary path from the first node to the destination. The originating node receives a packet along the alternate path and detects a failure of a link between the originating node and the destination. The originating node is configured with an alternate path to the destination that includes the first node, so originating node decides to reroute the packet back to first node. The originating node then incorporates a U-turn indicator into the packet before returning the packet to the first node. For another example, an originating node can receive a packet from a first node during convergence of a shortest path algorithm. If the shortest path algorithm has not yet converged at the originating node and the routing table in the originating node indicates that the packet is to be routed back to the first node, the originating node incorporates a U-turn indicator into the packet before returning the packet to the first node.

In response to receiving a packet including a U-turn indicator, nodes selectively forward the packet based on whether the node can identify a path to the destination of the packet that does not include the originating node for the packet that includes the U-turn indicator. The receiving node forwards the packet in response to identifying the path without the originating node. Otherwise, the receiving node drops the packet. For example, if the receiving node is along an alternate path from the originating node to a destination node and a link along the alternate path has failed, the receiving node attempts to identify a second alternate path to the destination node that does not traverse the originating node or the failed link. If the receiving node successfully identifies the second alternate path, the receiving node forwards the packet (including the U-turn indicator) along the second alternate path. Otherwise, the receiving node drops the packet. Thus, loops involving U-turn topologies are stopped if no alternate path that bypasses the U-turn is found.

FIG. 1 is a block diagram of an Internet Protocol (IP) network 100 that implements fast rerouting using precomputed alternate paths according to some embodiments. The IP network 100 includes nodes 101, 102, 103, 104, which are collectively referred to herein as "the nodes 101-104." In the illustrated embodiment, the nodes 101-104 are interconnected by the links 111, 112, 113, 114, which are collectively referred to herein as "the links 111-114." A shortest path first (SPF) algorithm is implemented in the nodes 101-104 and used to calculate paths between the nodes 101-104 based on weights associated with the links 111-114, which are indicated by the numerals in the circles next to the links 111-114. For example, the link 111 has a weight of 1. The SPF algorithm determines that the shortest path from the node 101 to the node 103 is via the node 102, as indicated by the arrows 121, 122.

The IP network 100 includes redundancy to support alternate paths between the nodes 101-104. Thus, packets are rerouted along alternate paths in response to failure of one of the links 111-114. In the illustrated embodiment, the link 111 fails, as indicated by the X. In response to detecting the failure, the nodes 101-104 run instances of the SPF algorithm to determine alternate paths through the IP network 100. For example, the node 101 runs the SPF algorithm and identifies an alternate path to the node 103 via the node 104, as indicated by the arrows 123, 124. The recovery time for this process is typically on the order of a few seconds. During the convergence (or re-convergence) time for the SPF algorithm, the node 101 drops packets because there is no available path to the node 103. Some applications that receive the packets can recover from the loss by ignoring the packets or requesting retransmission of the lost packets. However, other applications are significantly impacted by packet loss during convergence of the SPF algorithm. For example, voice applications typically expect round-trip response times of less than 250 milliseconds (ms) and an outage that causes the application to lose 3 to 5 seconds of voice packets is unacceptable.

Fast rerouting is used to avoid packet loss during convergence of the SPF algorithm to determine alternate paths. To implement fast rerouting, the nodes 101-104 precompute alternate paths through the IP network 100 in addition to a primary path. In the illustrated embodiment, the node 101 computes the primary path to the node 103 via the node 102 and computes the alternate path to the node 103 via the node 104. The primary path and the alternate path are stored in entries of a routing table implemented at the node 101 so that the node 101 can immediately switch over to the alternate path in response to detecting a failure along the primary path.

Figure 2:
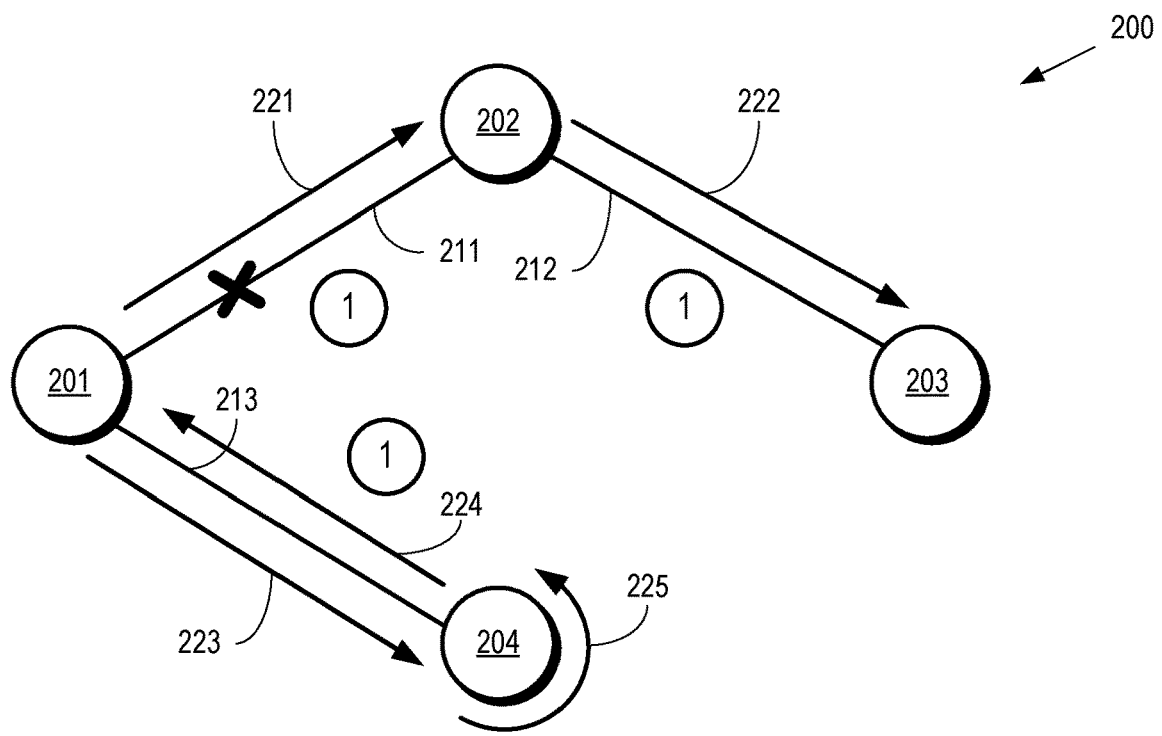
FIG. 2 is a block diagram of an IP network that includes a U-turn path as an alternate path according to some embodiments.

FIG. 2 is a block diagram of an IP network 200 that includes a U-turn path as an alternate path according to some embodiments. The IP network 200 includes nodes 201, 202, 203, 204, which are collectively referred to herein as "the nodes 201-204." In the illustrated embodiment, the nodes 201-204 are interconnected by the links 211, 212, 213, which are collectively referred to herein as "the links 211-213." An SPF algorithm is implemented in the nodes 201-204 and used to calculate primary and alternate paths between the nodes 201-204 based on weights associated with the links 211-213, which are indicated by the numerals in the circles next to the links 211-213. In the illustrated embodiment, the SPF algorithm determines that the primary path from the node 201 to the node 203 is via the node 202, as indicated by the arrows 221, 222. The SPF algorithm also determines that the alternate path is from the node 201 to the node 203 via the node 204, as indicated by the arrow 223. Since there is no direct link between the nodes 203, 204, the SPF algorithm implemented in the node 204 determines that the shortest path to the node 203 is via the node 201 (as indicated by the arrow 224) and then via the node 202, as indicated by the arrows 221, 222.

In the illustrated embodiment, the link 211 fails, as indicated by the X. In response to detecting the failure, the node 201 reroutes packets from the primary path to the alternate path towards the node 204. However, as discussed above, the SPF algorithm has programmed the routing table in the node 204 to route packets destined for the node 203 via the nodes 201, 202. Thus, the packets received by the node 204 from the node 201 perform a U-turn at the node 204, as indicated by the arrow 225. The node 204 continues to route packets towards the node 201 until the node 204 learns that the link 211 has failed, thereby creating a forwarding loop between the nodes 201 and 204 which renders a portion of the network 200 substantially unusable.

Conventional packets do not include header fields that can indicate whether a packet is being returned to a node (due to a U-turn) or the packet is being intentionally forwarded to a node that is programmed to route the packet back to the originating node (thereby forming a U-turn). The nodes 101-104 shown in FIG. 1 and the nodes 201-204 shown in FIG. 2 are therefore configured to incorporate a U-turn indicator into headers of packets that are (or will be) conveyed along paths including U-turn topologies. For example, a first node (such as the node 101 shown in FIG. 1 or the node 201 shown in FIG. 2) can incorporate a U-turn indicator into a header of a packet for transmission along a first path towards a second node (such as the node 103 shown in FIG. 1 or the node 203 shown in FIG. 2) that is configured to forward the packet back to the first node. The first node transmits the packet including the header having the U-turn indicator along the first path. Nodes that receive a packet including a U-turn indicator selectively forward the packet (if a path that does not include the originating node can be found) or drop the packet (if a path that does not include the originating node cannot be found). Some embodiments of U-turn indicator include one or more flags such as flags to encode a reason associated with the U-turn such as an indication that the packet is being fast rerouted along a U-turn alternate path, an indication that the packet previously performed a U-turn at a node, and the like. The flags can also encode information indicating that the address of the originating node is included in the U-turn indicator. The U-turn indicator is included in an IPv4 option or an IPv6 extension header. In some embodiments, the destination address field is included in the U-turn indicator to preserve the original destination address in the IP header because the IPv4 option (or an IPv6 extension header) is evaluated by a receiving router only if the destination address in IP header belongs to the receiving router. In other embodiments, the U-turn indicator is evaluated regardless of whether the destination address belongs to the receiving router, in which case the U-turn indicator does not have to carry a destination address field.

Figure 3:
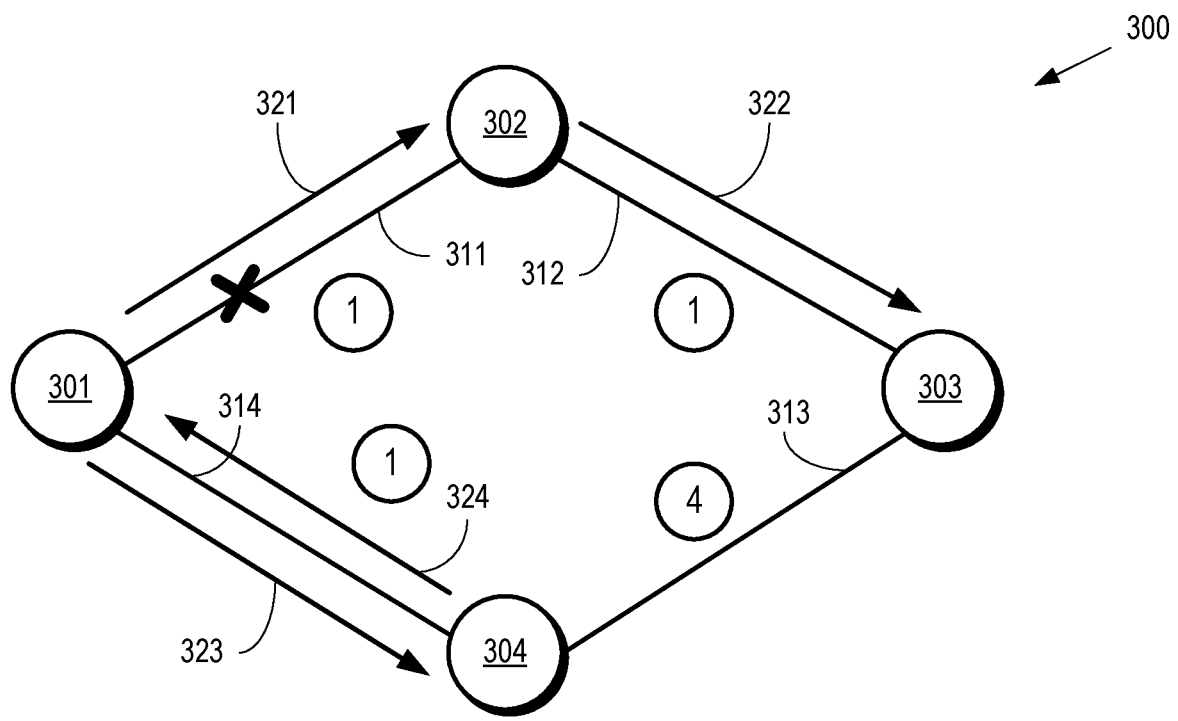
FIG. 3 is a block diagram of an IP network that implements fast rerouting using precomputed alternate paths along links with varying weights according to some embodiments.

FIG. 3 is a block diagram of an IP network 300 that implements fast rerouting using precomputed alternate paths along links with varying weights according to some embodiments. The IP network 300 includes nodes 301, 302, 303, 304, which are collectively referred to herein as "the nodes 301-304." In the illustrated embodiment, the nodes 301-304 are interconnected by the links 311, 312, 313, 314, which are collectively referred to herein as "the links 311-314." An SPF algorithm is implemented in the nodes 301-304 and used to calculate paths between the nodes 301-304 based on weights associated with the links 311-314, which are indicated by the numerals in the circles next to the links 311-314. The network 300 differs from the network 100 shown in FIG. 1 because the weight associated with the link 313 has a weight of 4.

The SPF algorithm determines that the shortest path from the node 301 to the node 303 is via the node 302, as indicated by the arrows 321, 322. The SPF algorithm also determines that the alternate path is from the node 301 to the node 303 via the node 304, as indicated by the arrow 323. Due to the relatively high weight (of 4) on the link 313 between the nodes 303, 304, the SPF algorithm implemented in the node 304 determines that the shortest path to the node 303 is via the node 301 (as indicated by the arrow 324) and then via the node 302, as indicated by the arrows 321, 322. The path along the link 313 between the nodes 303, 304 is a loop free alternative (LFA) path available to the node 304. However, the node 304 does not route packets along the LFA path including the link 313 until the node 304 detects failure of link 314.

In the illustrated embodiment, the link 311 fails, as indicated by the X. In response to detecting the failure, the node 301 reroutes packets from the primary path to the alternate path towards the node 304. However, as discussed above, the SPF algorithm has programmed the routing table in the node 304 to route packets destined for the node 303 on a primary path via the nodes 301, 302. The node 304 therefore continues to route packets along the U-turn route back to the node 301 until the SPF algorithm converges and the node 304 becomes aware that the link 311 has failed. Thus, the U-turn topology that results from failure of the link 311 causes a loop to form over the link 314 between the nodes 301 and 304.

In order to prevent looping of the packet over the link 314, the node 301 programs an entry in its routing table that indicates that the backup next hop for fast rerouting traffic on failure of the link 311 is to forward the packets to the node 304. The node 301 also programs the entry to indicate that the path to the node 304 is a U-turn path because the node 304 is programmed to forward packets back to the node 301. In response to detecting failure of the link 311, the node 301 fast reroutes packets to the backup next hop node 304. The node 301 also includes a U-turn indicator in an option or extension header of the rerouted packets based on the U-turn indication programmed into the routing table. The U-turn indicator includes a destination address from the IP header of the packet in a destination IP address field. The destination address in the IP header of the packet is set to the IP address of the backup next hop node 304. In some embodiments, one or more flags in the U-turn indicator are set to indicate that the node 301 is forwarding the packet along a U-turn alternate path. The IP address of the node 301 is optionally included to indicate a field of the U-turn indicator that includes an originator IP address.

The packet is received by the node 304 and identifies the U-turn indicator in the option or extension header of the packet. The node 304 reads the destination address for the packet from the destination IP address field in the U-turn indicator. The node 304 then looks up the primary path to the node 303 based on the destination IP address in the U-turn indicator and verifies that the primary path includes a U-turn for the packet. In response to verifying the U-turn topology, the node 304 attempts to identify an alternate path (LFA or U-turn) that is programmed into a routing table at the node 304. In the illustrated embodiment, the node 304 identifies the LFA path along the link 313, which does not include the originating node 301. The node 304 therefore forwards the packet along the link 313 to the node 303. The node 304 includes the U-turn indicator in the packet that is forwarded over the link 313 in case there are additional nodes between the node 304 and the node 303. The node 304 then sets the destination address of the IP header of the packet to the address of the node 304 and transmits the packet over the link 313 towards the node 304. If the node 304 is unable to identify a path towards the node 303 that does not include the node 301, the node 304 drops the packet.

Figure 4:
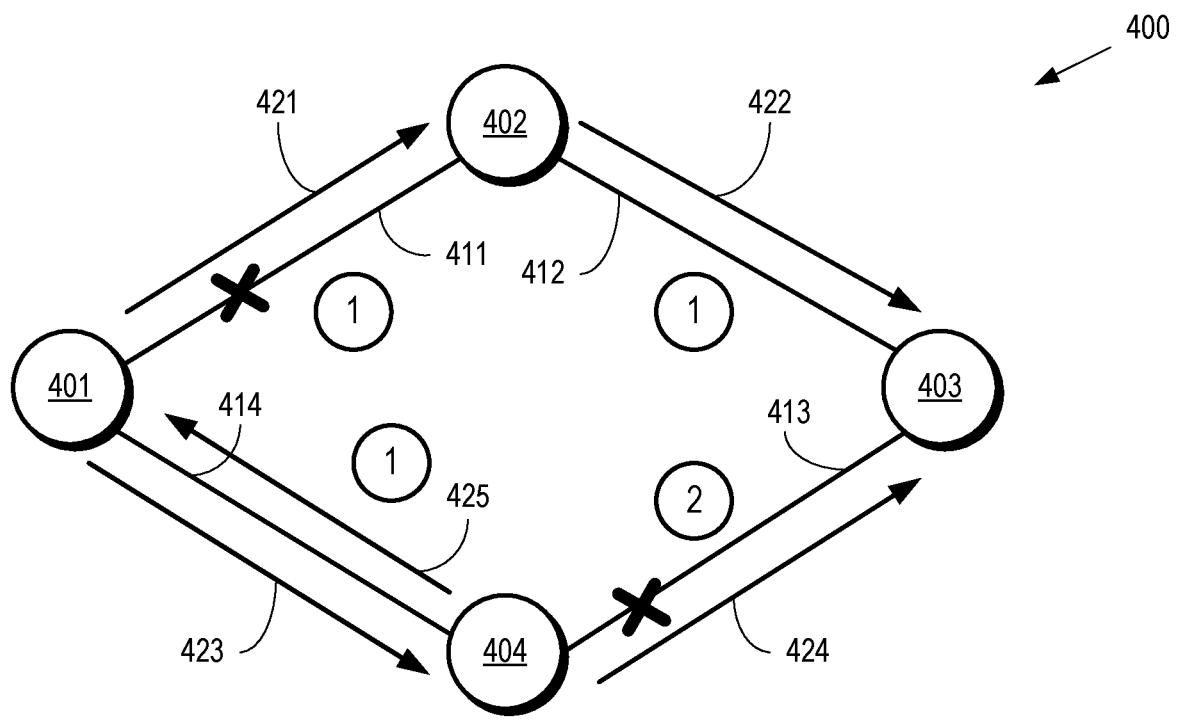
FIG. 4 is a block diagram of an IP network that implements fast rerouting in a dual failure scenario according to some embodiments.

FIG. 4 is a block diagram of an IP network 400 that implements fast rerouting in a dual failure scenario according to some embodiments. The IP network 400 includes nodes 401, 402, 403, 404, which are collectively referred to herein as "the nodes 401-404." In the illustrated embodiment, the nodes 401-404 are interconnected by the links 411, 412, 413, 414, which are collectively referred to herein as "the links 411-414." An SPF algorithm is implemented in the nodes 401-404 and used to calculate paths between the nodes 401-404 based on weights associated with the links 411-414, which are indicated by the numerals in the circles next to the links 411-414. The network 400 differs from the network 400 shown in FIG. 1 because both the link 411 and the link 413 have failed in the illustrated embodiment.

Prior to failure of the links 411, 413, the SPF algorithm determines that the shortest path from the node 401 to the node 403 is via the node 402, as indicated by the arrows 421, 422. The SPF algorithm also identifies an LFA path from the node 401 to the node 403 via the node 404, as indicated by the arrows 423, 424. The SPF algorithm then programs entries in the routing tables in the node 401 to indicate the primary path and the LFA path. The SPF algorithm determines that the shortest path from node 404 to the node 403 is via link 413 which is indicated by arrow 424. The SPF algorithm also identifies an LFA path from node 404 to node 403 via node 401, as indicates by the arrows 423, 421, 422. However, the dual failure of the links 411, 413 causes the node 401 to forward packets to the node 404 (as indicated by the arrow 423) and causes the node 404 to forward packets back the node 401 (as indicated by the arrow 425), thereby creating a micro loop and rendering that portion of the network 400 unusable.

To avoid forming the loop between the nodes 401 and 404 in the dual failure scenario, the node 404 includes a U-turn indicator in the packet that was received from the node 401 before the node 404 returns the packet to the node 401. The destination address that was included in the IP header of the packet received from the node 401 (e.g., the address of the node 403) is preserved in the destination IP address field of the U-turn indicator. The destination address in the IP header of the packet that is returned to the node 401 is set to the address of the node 401. In the illustrated embodiment, flags in the U-turn indicator are set to indicate that the packet has made a U-turn and, optionally, the IP address of the node 404 is included as the originator IP address in the U-turn indicator. In response to receiving the packet including the U-turn indicator, the node 401 attempts to rerouting the packet via a path that does not include the node 404 that originated the U-turn indicator. If successful, the node 401 forwards the packet along the alternate path. Otherwise, the node 401 drops the packet, thereby preventing formation of the loop.

Although the formation of micro loops as discussed in FIGS. 1-4 in the context of alternate or LFA paths for fast rerouting, loops are also formed in some embodiments that use other forms of policy-based routing (PBR) or flow-based routing. For example, if the links 411, 412, 414 have weights of 1 and the link 413 has a weight of 4 (as shown in FIG. 3), a routing table in the node 401 indicates that the shortest path between the nodes 401 and 403 is via the node 402. If the node 401 is configured with PBR or flow-based routing, the node 401 uses a set of rules that are applied based on fields included in one or more headers of the packets processed by the node 401. The rules associate packets with different paths based on a mapping between the paths and the values of the fields in the headers of the packets. Thus, the PBR or flow-based routing rules can override the entries in the routing table determined based on shortest path routing and steer packets to an alternate next hop based on the rules. Loops can form if the PBR or flow-based routing rules cause packets to be forwarded along U-turns, e.g., if the node 401 forwards packets to the node 404 and the node 404 forwards the packets back to the node 401.

Figure 5:
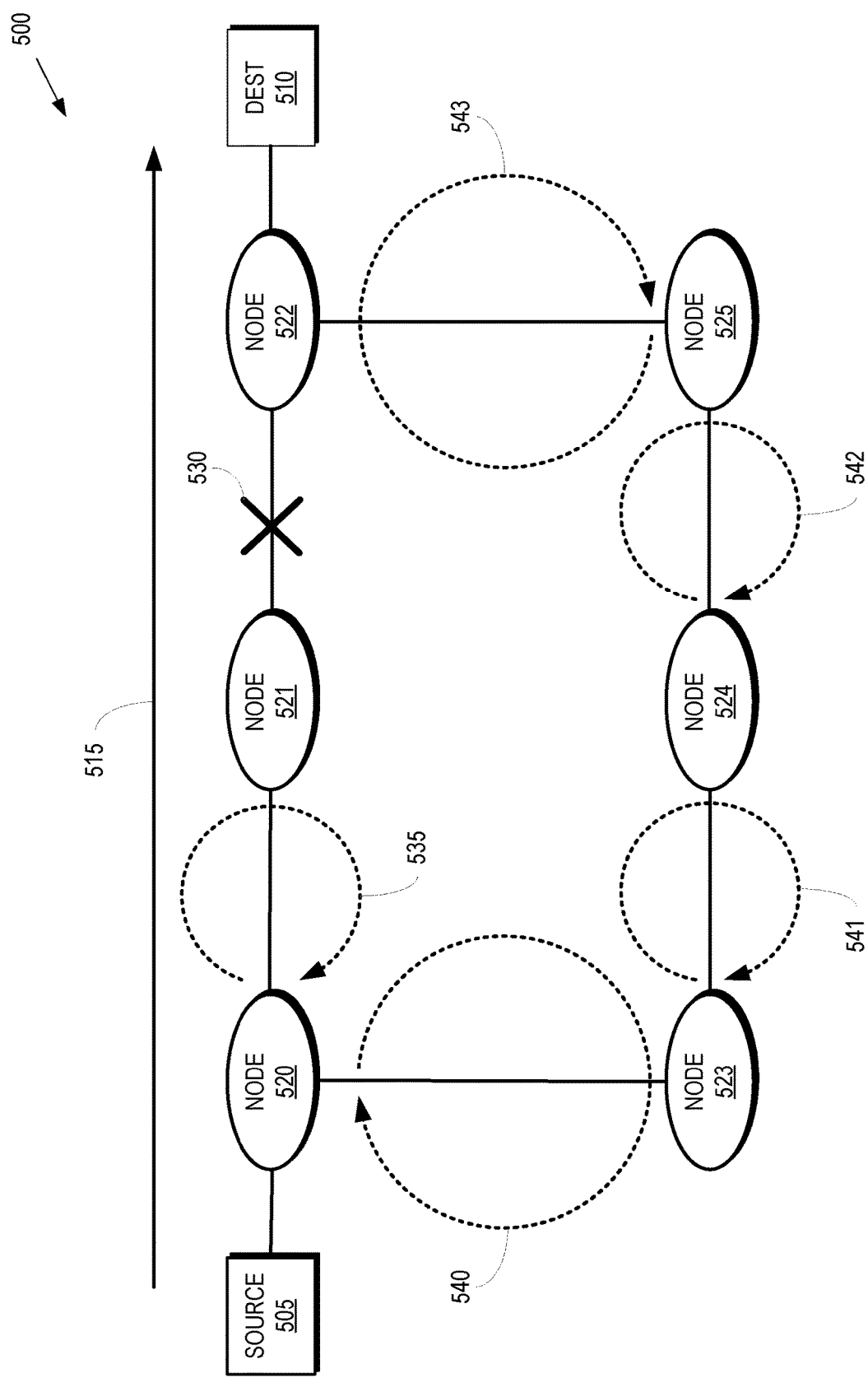
FIG. 5 is a block diagram of the communication system that has developed micro-loops during convergence of a shortest path first (SPF) algorithm according to some embodiments.

FIG. 5 is a block diagram of the communication system 500 that has developed micro-loops during convergence of an SPF algorithm according to some embodiments. The communication system 500 provides communication pathways to convey packets from a source 505 to a destination 510, as indicated by the arrow 515. The source 505 and the destination 510 are implemented in one or more entities such as desktop computers, laptop computers, tablet computers, smart phones, Internet of Things (IoT) devices, and the like. The communication system 500 includes a set of nodes 520, 521, 522, 523, 524, 525, which are collectively referred to herein as "the nodes 520-525."

Packets are conveyed from the source 505 to the destination 510 along a path that includes the nodes 520-522. In the illustrated embodiment, a link between the node 521 and the node 522 fails, as indicated by the cross 530. In response to failure of the link, the nodes 521 and 522 sends a link state update that informs the nodes 520-525 that the link has failed. The SPF algorithm implemented in the nodes 520-525 eventually determines that the shortest path from the source 505 to the destination 510 is from the node 520 to the node 522 via the nodes 523-525. However, the SPF algorithm takes a finite amount of time to converge at the nodes 520-525 and does not necessarily converge at the same time at all the nodes 520-525, which can result in the nodes 520-525 forwarding packets along an inconsistent path.

Loops form between the nodes 520-525 while the SPF algorithms are converging at the nodes 520-525. For example, if the SPF algorithm at the node 521 converges before the SPF algorithm at the node 520, the node 520 continues to forward packets to the node 521 (along the original shortest path) and the node 521 forwards the packets back to the node 520 (along the new shortest path), thereby forming a loop 535. In response to the SPF algorithm converging at the node 520, the node 520 forwards packets to the node 523. However, if the SPF algorithm has not yet converged at the node 523, the node 520 forwards packets to the node 523 (along the new shortest path) and the node 523 forwards the packets back to the node 520 (along the original shortest path) thereby forming a loop 540. In a similar manner, loops 541, 542, 543 can form while the SPF algorithm is converging at the nodes 522, 524, 525. The loops 535, 540-543 form between pairs of nodes 520-525 and are therefore referred to herein as micro-loops. The duration of the loops is proportional to the time required to propagate the topology change through the network, as well as the time required for the SPF algorithm to converge at the nodes 520-525 and for the nodes 520-525 to update their routing tables.

In principle, the effects of the micro-loops could be eliminated by speeding the whole convergence process to almost zero, but fundamental limits such as the speed of light and memory update latency make this highly unlikely or impossible. Some embodiments of IP networks reduce the impact of transient loops using Fast-Rerouting (FRR) of packets, as discussed herein. The FRR technique uses LFA paths computed by link state protocols as a backup path if the backup path does not cause a forwarding loop. To avoid forwarding loops, the nodes 520-525 perform additional calculations to verify that a candidate backup path does not create a forwarding loop. A path that does not cause a forwarding loop is identified as an LFA path. The nodes 520-525 identify the LFA paths in advance and install them against the respective primary paths (shortest paths) into the routing tables of the nodes 520-525.

The loops 535, 540-543 are avoided by configuring the nodes 520-525 to incorporate U-turn indicators into packets. In the illustrated embodiment, the node 520 forwards packets to the node 521 (along the original shortest path) and the routing table in the node 521 indicates that the packet should be forwarded back to the node 520 (along the new shortest path), which causes the loop 535 to form, as discussed herein. However, the loop 535 is avoided or bypassed if the node 521 incorporates a U-turn indicator into the packet received from the node 520 before forwarding the packet back to the node 520. In response to receiving the packet including the U-turn indicator, the node 520 attempts to identify an alternate path to the destination 510 that does not include the node 521. If the node 520 is successful in identifying an alternate path, e.g., because the SPF algorithm has converged and the node 520 has identified the path to the node 523, the node 520 forwards the packet along the alternate path. Otherwise, the node 520 drops the packet, thereby keeping the packet from being caught in the loop 535.

Figure 6:
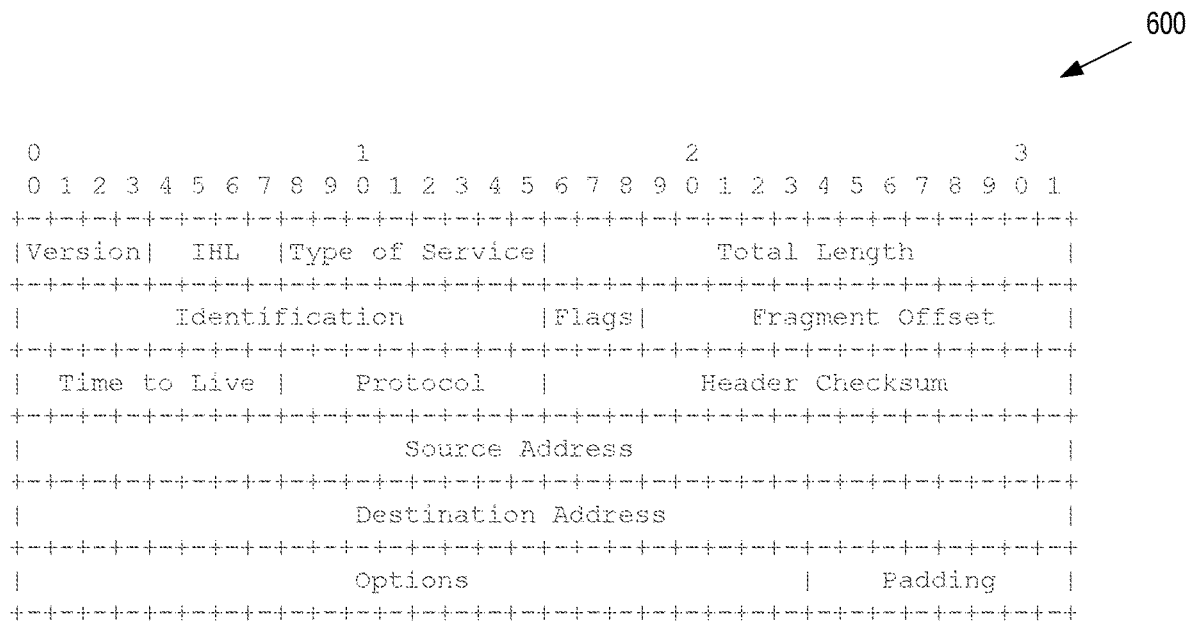
FIG. 6 illustrates an IPv4 header including options that convey U-turn indicators according to some embodiments.

FIG. 6 illustrates an IPv4 header 600 including options that convey U-turn indicators according to some embodiments. The IPv4 header 600 is included in packets transmitted in some embodiments of the communication systems 100, 200, 300, 400, 500 shown in FIGS. 1-5. The options fields in the IPv4 header 600 provide for control functions that are needed or useful in some situations but are unnecessary for the most common communications. The Options include provisions for timestamps, security, and special routing.

The options start with a 1-octet type field followed by type specific encoding. Options are of variable length. Thus, minimum size of an Option is 1-octet (Only type) if it does not have any type specific data. The maximum size of an Option is limited by maximum permissible value of IHL field in the IPv4 Header 600.

The 1-octet Type is viewed as having 3 fields:
1 bit copied flag,
2 bits option class,
5 bits option number.
The copied flag indicates that this option is copied into all fragments on fragmentation.
0=not copied
1=copied
The option classes are:
0=control
1=reserved for future use
2=debugging and measurement
3=reserved for future use
The IPv4 header includes an IPv4 option that is referred to herein as a "U-turn indicator option." If the U-turn indicator option is standardized, then the option number 31 is reserved in the IPv4 parameter registry in IANA. For example, the U-turn indicator can have the format:

| COPY | CLASS | NUMBER | LENGTH | DESCRIPTION |
|------|-------|--------|--------|-------------|
| 1 | 0 | 31 | var. | U-turn indicator. |

An IPv4 option is processed by a receiving router if the destination address in the IPv4 header is a local address in the receiving router. Thus, when U-turn indicator option is included in a packet, the original destination address in the IPv4 header is preserved in the U-turn indicator. Some embodiments of the U-turn indicator include additional flags that encode one or more reason codes, such as codes that indicate whether packet is being fast rerouted along a U-turn alternate path or the packet has previously made a U-turn at another node. In some embodiments, a local IPv4 address of the node that originated the U-turn indicator is encoded in the U-turn indicator option; if present then it is indicated in the flags. The U-turn indicator option therefore carries the fields:

{Destination IPv4 Address,Flags,<Originator's IPv4 Address>}

Parameters within "< >" are not included in some embodiments. In response to a node receiving an IPv4 packet with a destination address for the node and with a U-turn indicator option, the node makes a forwarding decision for the packet based on the Destination IPv4 Address in the U-turn indicator. If the node decides to pass along the option in the forwarded packet, then the node sets the destination address in the IPv4 header to the next hop IPv4 address. If the node decides to exclude the options from the forwarded packet, then the node sets the destination address in IPv4 header to the original address, e.g., the Destination IPv4 Address in the U-turn indicator.

Figure 7:
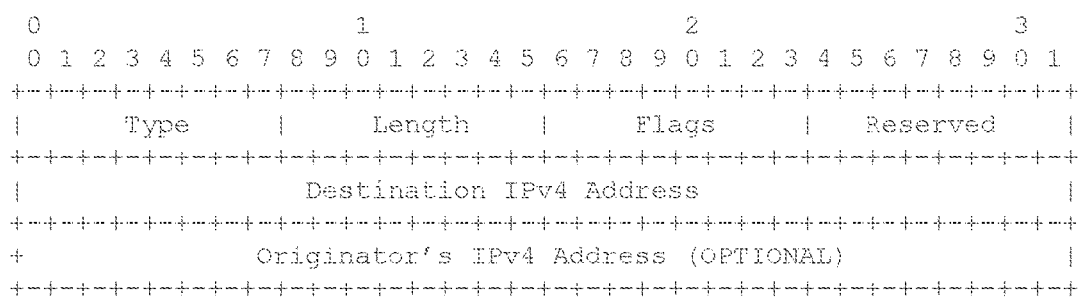
FIG. 7 illustrates a U-turn indicator option that is included in an IPv4 header according to some embodiments.

FIG. 7 illustrates a U-turn indicator option 700 that is included in an IPv4 header according to some embodiments. The U-turn indicator option 700 is included in some embodiments of the IPv4 header 600 shown in FIG. 6. The fields in the encoding of the U-turn indicator option 700 are as follows.

Type: 1-octet field that indicates U-turn indicator option in tuples of COPY, CLASS and NUMBER.

Length: 1-octet field that indicates length of this option that includes Type, Length, Flags, Reserved, Destination IPv4 Address and optional Originator's IPv4 Address. If Originator's IPv4 Address is included then length is 12, otherwise the length is 8.

Flags: 1-octet field that indicates several flags as below:

```
+-+-+-+-+-+-+-+-+
|         |O|U|F|
+-+-+-+-+-+-+-+-+
```

F: If set to 1, then indicates that packet is fast rerouted along a U-turn alternate path.
U: If set to 1, then indicates that packet has made a U-turn.
O: If set to 1, the indicates Originator's IPv4 Address field is present.

Reserved: 1-octet field reserved for future use. Sender sets this field to 0 and receiver ignores this field.

Destination IPv4 Address: The original destination address from IPv4 Header is preserved in this 4-octet field.

Originator's IPv4 Address: Optional 4-octet field, which is present only if O flag is set to 1. This field carries an IPv4 address of the router that originated the U-turn indicator in the IPv4 packet.

In some embodiments, an IPv4 Router Alert option is used in conjunction with including U-turn indicator option in an IPv4 packet. The presence of the Router Alert option in the IPv4 packet means a receiver examines the contents of the IPv4 packet irrespective of the destination address in the IPv4 header of the packet. Examination of the IPv4 packet includes examination of the U-turn indicator option, if present. Since the original destination address in the IPv4 header remains unmodified when U-turn indicator option is included along with Router alert option, the Destination IPv4 Address field in not required in U-turn indicator. Thus, some embodiments define the U-turn indicator option with following fields:

{Flags,<Originator's IPv4 Address>}

Figure 8:
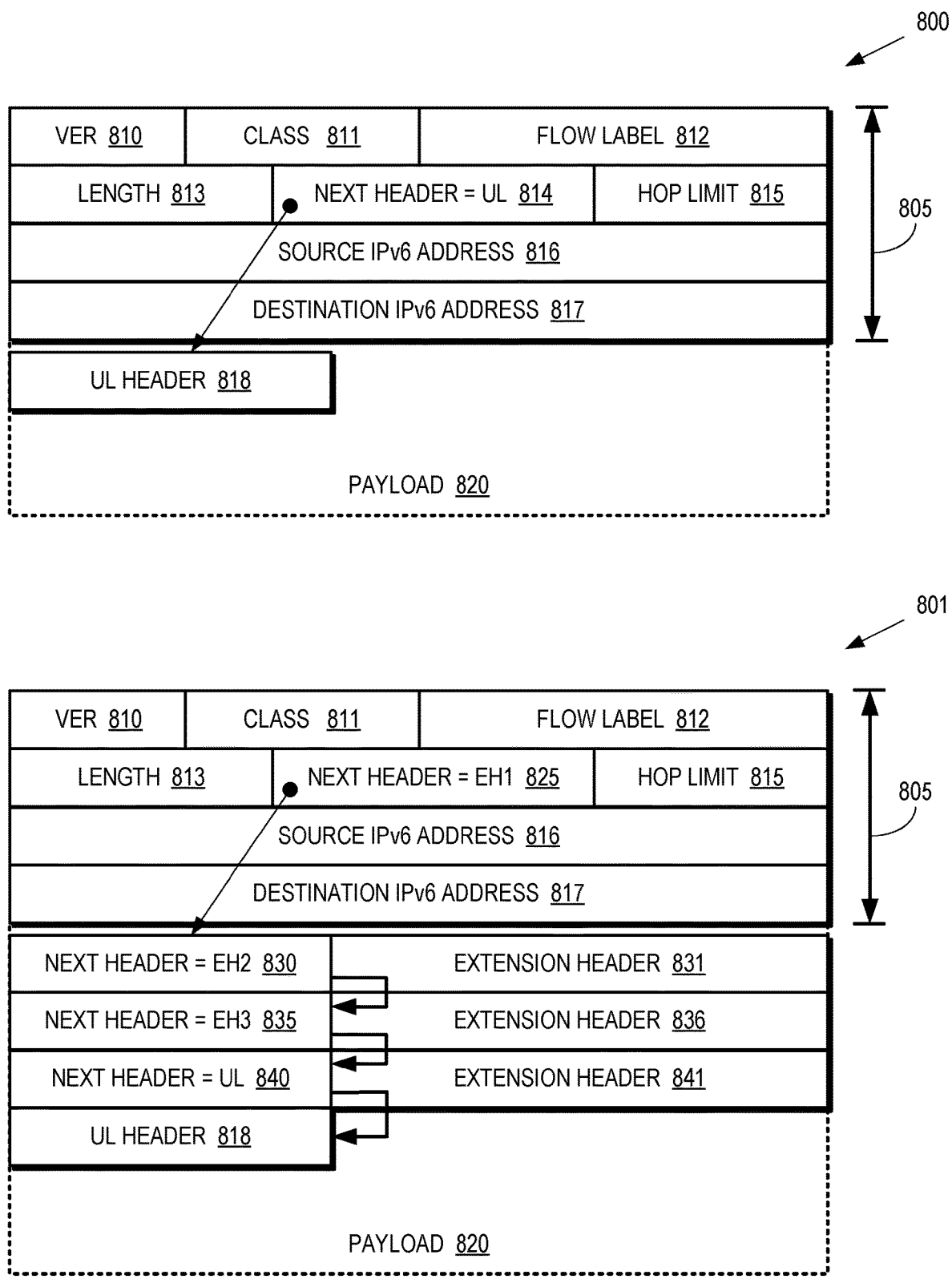
FIG. 8 illustrates IPv6 headers that include header extensions such as a header extension that conveys U-turn indicators according to some embodiments.

FIG. 8 illustrates IPv6 headers 800, 801 that include header extensions such as a header extension that conveys U-turn indicators according to some embodiments. The IPv6 header 800 is included in packets transmitted in some embodiments of the communication systems 100, 200, 300, 400, 500 shown in FIGS. 1-5. The IPv6 headers 800, 801 include a first portion 805 made up of a set of fields including a version field 110, a class field 811, a flow label 812, a length 813, a next header field 814, a hop limit 815, a source address 816, and a destination address 817. The next header field 814 includes information (such as a pointer) to an additional header such as an upper layer header 818. Examples of upper layer headers are transport protocol headers such as TCP, UDP, SCTP, etc. The IPv6 headers 800, 801 are appended to a corresponding payload 820 to form an IPv6 packet.

The first portion 805 of the IPv6 header remains fixed in size (e.g., 40 bytes) and extension headers are added to provide for control functions in some embodiments. For example, extension headers can be used for timestamps, security, and special routing. In the illustrated embodiment, the next header field 825 includes information (such as a pointer) indicating another next header field 830 that is associated with extension header 831. The next header field 830 includes information (such as a pointer) indicating a subsequent next header field 835 that is associated with extension header 836. The next header field 835 includes information (such as a pointer) indicating a subsequent next header field 840 that is associated with extension header 841. The next header field 840 includes information (such as a pointer) to the upper layer header 818. Although four next header fields 825, 830, 835, 840 are shown in FIG. 8, some embodiments of the IPv6 header 800 include more or fewer next header fields.

In the illustrated embodiment, one of the extension headers 831, 836, 841 is used for a U-turn indicator. The IPv6 extension headers 831, 836, 841 are processed by a receiving node only if the destination address 817 in the IPv6 header 805 is a local address in the receiving node. If a U-turn indicator header is included in a packet, the original destination address 817 in the IPv6 header 805 is preserved in the U-turn indicator header. Some embodiments of the U-turn indicator include one or more additional flags that encode one or more reason codes, such as whether packet is fast rerouted along a U-turn alternate path or the packet made a U-turn, and the like. In some embodiments, a local IPv6 address of the node that originated the U-turn indicator is encoded in the U-turn indicator header. If the local IPv6 address of the node is present in the U-turn indicator, then it is indicated in the flags. The U-turn indicator header carries the fields:

{Destination IPv6 Address,Flags,<Originator's IPv6 Address>}

Parameters enclosed within "< >" are not included in some embodiments. When a node receives an IPv6 packet with destination address 817 that refers to the node and with U-turn indicator header, the node makes the forwarding decision for the packet based on the Destination IPv6 Address in the U-turn indicator. If the node decides to pass along the extension header in the forwarded packet, then the node sets the destination address 817 in the IPv6 header to the next hop IPv6 address. If the node decides to exclude the extension header from the forwarded packet, then the node sets the destination address 817 in IPv6 header to the original destination address, e.g., the Destination IPv6 Address in the U-turn indicator. In some embodiments, the type of the extension header including the U-turn indicator is type 150 and is referred to as a "U-turn Indicator Header" to carry the U-turn indicator in an IPv6 packet. If the techniques disclosed herein are standardized, then the EH Type is reserved in IPv6 parameters registry in IANA.

Figure 9:
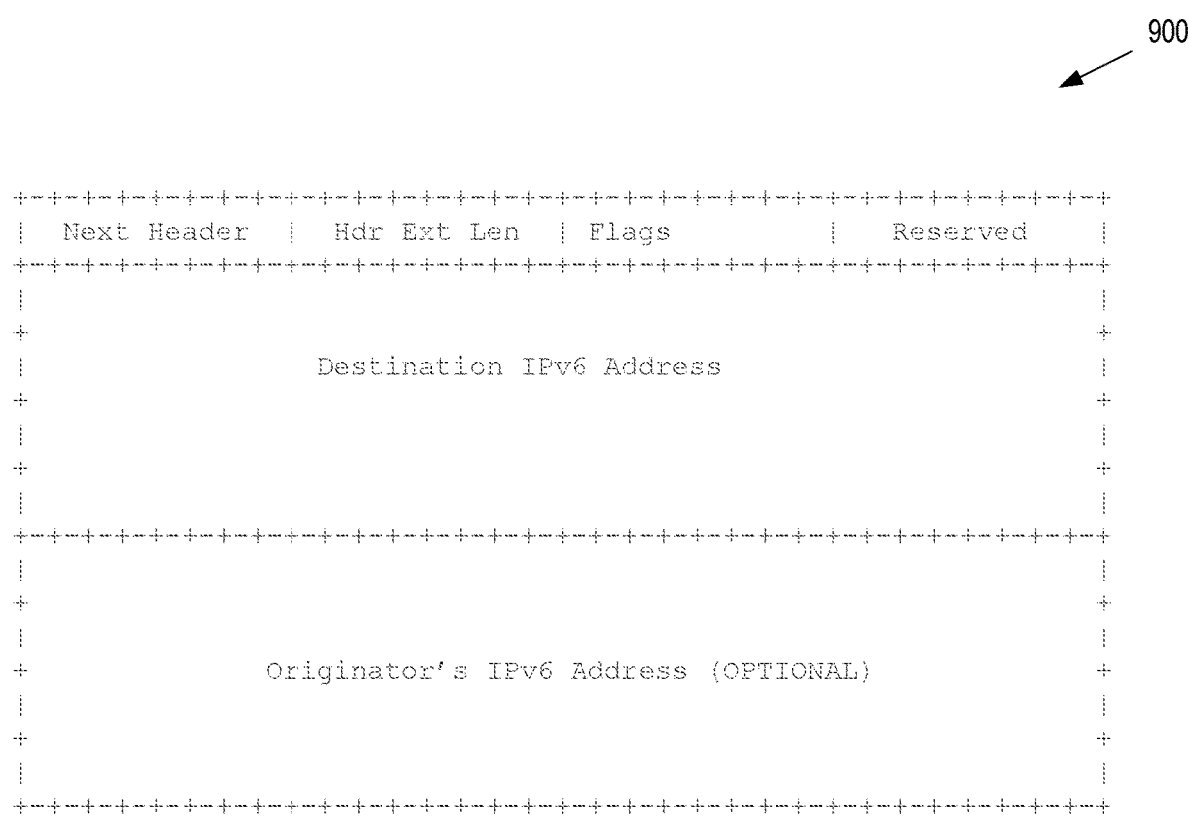
FIG. 9 illustrates a U-turn indicator header that is included in an IPv6 header according to some embodiments.

FIG. 9 illustrates a U-turn indicator header 900 that is included in an IPv6 header according to some embodiments.

The U-turn indicator header 900 is included in some embodiments of the IPv6 header 800 shown in FIG. 8. The fields in the encoding of the U-turn indicator header 900 are as follows:

Next Header 8-bit selector. Identifies the type of header immediately following the U-turn Indicator Header. Uses the same values as the IPv4 Protocol field [PROT_NUM].

Hdr Ext Len 8-bit unsigned integer. Length of the U-turn header in number of octets, not including the first 2 octets. If the optional Originator's IPv6 Address is included then value of this field is 34, else 18.

Flags: 1-octet field that indicates several flags as below:

```
+-+-+-+-+-+-+-+-+
|         |O|U|F|
+-+-+-+-+-+-+-+-+
```

F: If set to 1, then indicates that packet is fast rerouted along a U-turn alternate path.
U: If set to 1, then indicates that packet has made a U-turn.
O: If set to 1, the indicates Originator's IPv6 Address field is present.

Reserved: 1-octet field reserved for future use. Sender sets this field to 0 and receiver ignores this field.

Destination IPv6 Address: The original destination address from IPv6 Header is preserved in this 16-octet field.

Originator's IPv6 Address: 16-octet field, which is present in some embodiments if 0 flag is set to 1. This field carries an IPv6 address of the router that originated the U-turn indicator header in the IPv6 packet.

In some embodiments the U-turn indicator is encoded as a TLV in an IPv6 Hop-by-Hop options EH. The presence of a Hop-by-Hop options header in the IPv6 packet means a receiver examines the information within the header, irrespective of the destination address in the IPv6 header of the packet. The Hop-by-Hop options header can carry one or more TLVs and each TLV encodes independent information to be examined routers that forward the IPv6 packet. Since the original destination address in the IPv6 header remains unmodified when U-turn indicator option is encoded as a TLV in a Hop-by-Hop options header, the Destination IPv6 Address field in not required in U-turn indicator. Thus, some embodiments define the U-turn indicator option with following fields:

{Flags,<Originator's IPv6 Address>}

Figure 10:
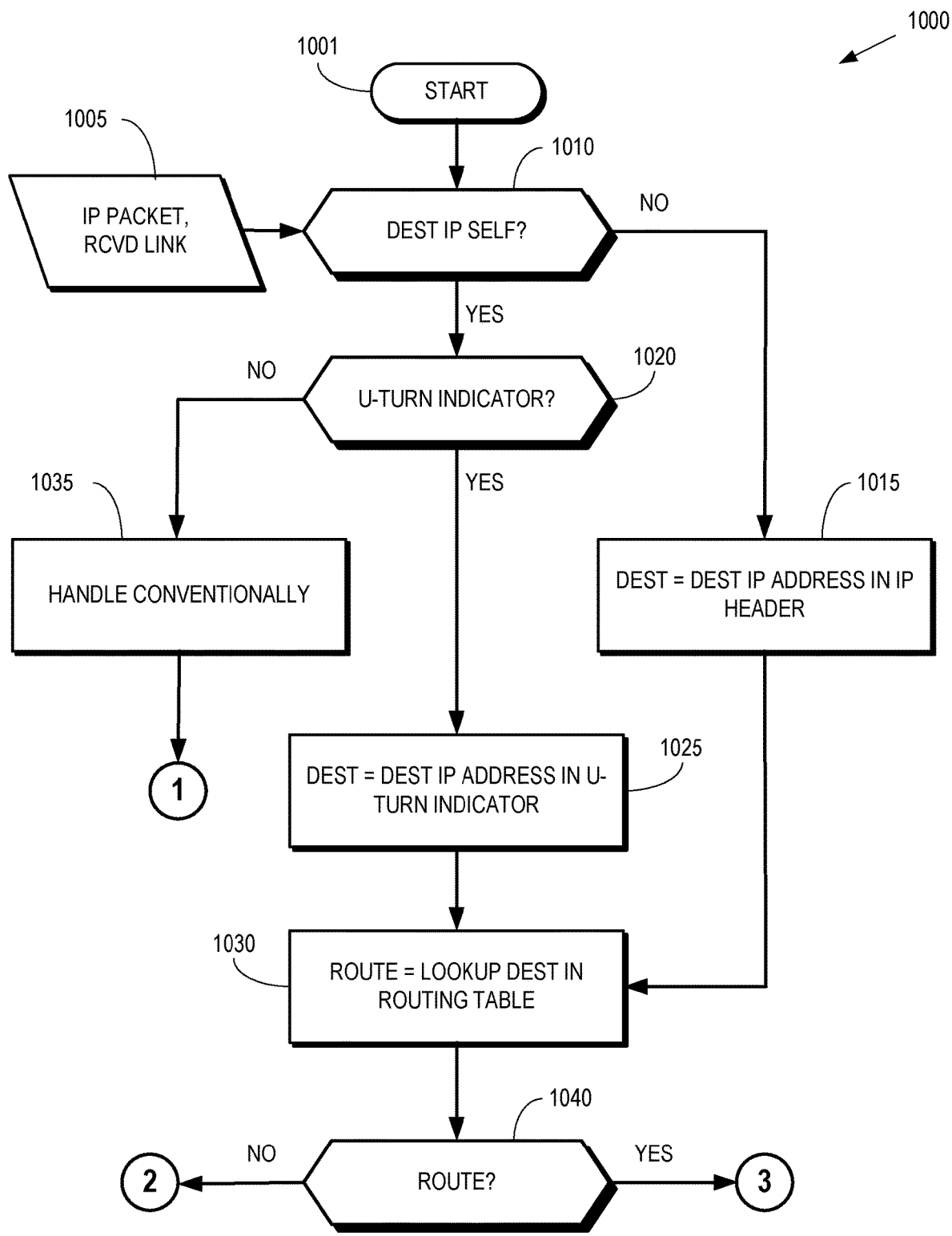
FIG. 10 is a flow diagram of a first portion of a method of originating and processing a U-turn indicator according to some embodiments.

FIG. 10 is a flow diagram of a first portion 1000 of a method of originating and processing a U-turn indicator according to some embodiments. The first portion 1000 of the method is implemented at the nodes in some embodiments of the communication systems 100, 200, 300, 400, 500 shown in FIGS. 1-5.

The method begins at block 1001. The method receives input 1005 including the IP packet that is to be forwarded by the node and the link/interface on which the IP packet arrived at the node.

At block 1010, the node determines whether the destination address in the IP header of the IP packet is local to the node. If not, the method flows to the block 1015. If the destination address in the IP header of the IP packet is local to the node, the method flows to decision block 1020.

At block 1015, the node reads the destination address in the IP header as a key (or index) for looking up a corresponding entry in the routing table. The method then flows to the block 1030.

At the decision block 1020, the node determines whether the IP header includes a U-turn indicator. If not, the method flows to the block 1035 and the node handles the IP packet using conventional techniques. The method then flows to the node 1, which connects to the node 1 in FIG. 12. If the IP header includes a U-turn indicator, the method flows to the block 1025.

At block 1025, the node reads the destination address field from the U-turn indicator and uses the value in the destination address field as the key (or index) for looking up a corresponding entry in the routing table.

At block 1030, the node uses the key (or index) determined in block 1015 or block 1025 to look up a corresponding entry in the routing table for the node.

At decision block 1040, the node determines whether a corresponding entry that matches the key (or index) is found in the routing table. If not, the method flows to node 2, which connects with the node 2 in FIG. 12. If the node identifies a matching entry in the routing table, the method flows to node 3, which connects with the known 3 in FIG. 11.

Figure 11:
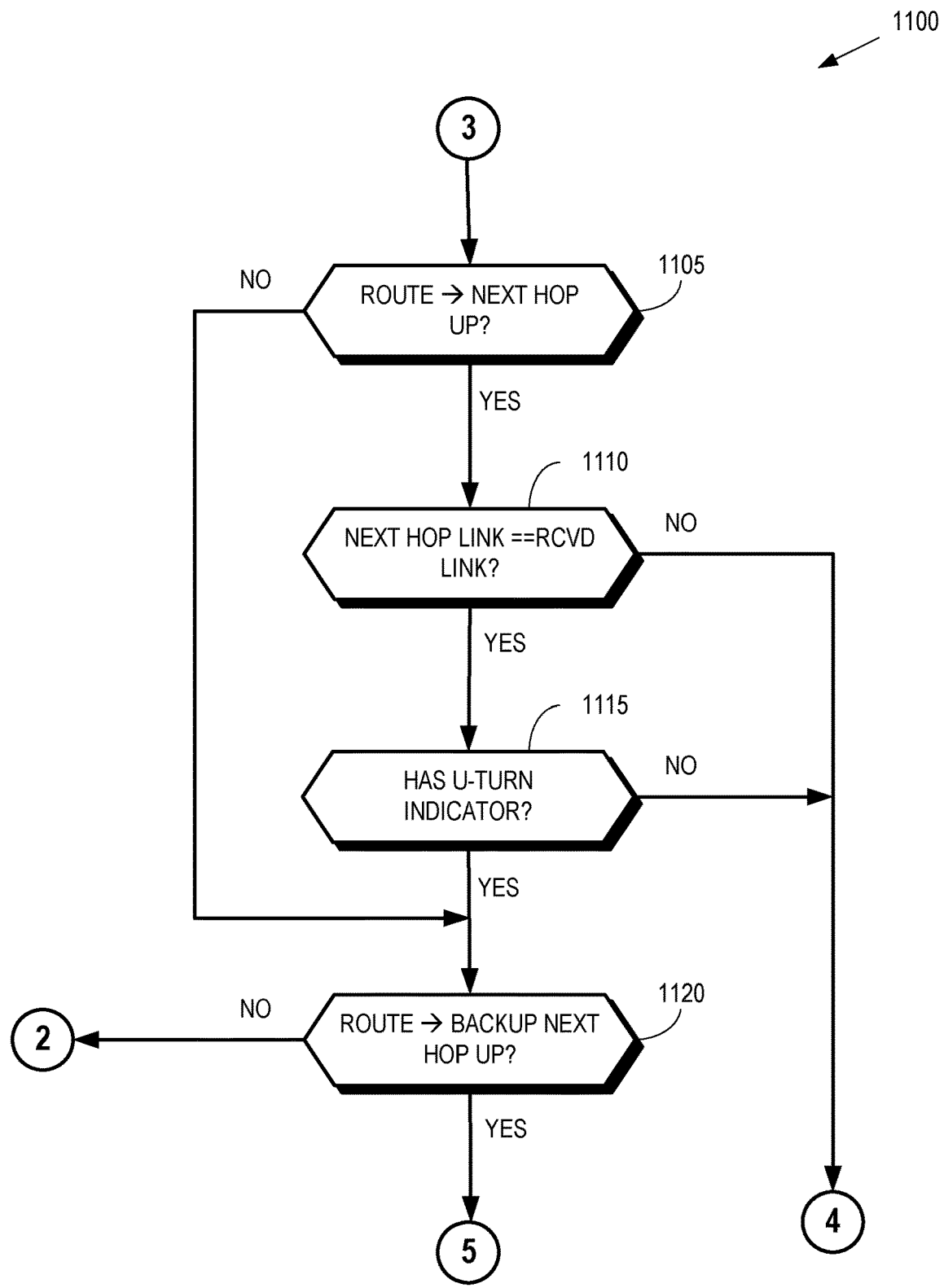
FIG. 11 is a flow diagram of a second portion of the method of originating and processing a U-turn indicator according to some embodiments.

FIG. 11 is a flow diagram of a second portion 1100 of the method of originating and processing a U-turn indicator according to some embodiments. The second portion 1100 of the method is implemented at the nodes in some embodiments of the communication systems 100, 200, 300, 400, 500 shown in FIGS. 1-5. Node 3 connects the decision block 1105 with the decision block 1040 in FIG. 10.

At decision block 1105, the node determines whether the next hop along the primary path for the IP packet is operational. If so, the method flows to the decision block 1110. Otherwise, the method flows to the decision block 1120.

At decision block 1110, the node determines whether the next hop link is the same as the link that conveyed the IP packet to the node. If so, the path traversed by the IP packet has a U-turn topology and the method flows to the decision block 1115. If not, the method flows to the node 4, which connects to the node 4 in FIG. 12.

At decision block 1115, the node determines whether the IP packet includes a U-turn indicator. If not, the method flows to the node 4, which connects to the node 4 in FIG. 12. If the IP packet includes a U-turn indicator, e.g., in an option of the header or an extension header, the method flows to decision block 1120. The presence of a U-turn indicator in the IP packet indicates that the IP packet should not make an additional U-turn. Instead, the IP packet should be forwarded on an alternate next hop associated with a path that does not include the originating node for the U-turn indicator. The IP packet should be dropped if an alternate next hop cannot be found.

At decision block 1120, the node determines whether there is a backup next hop that is operational. If not, the method flows to the node 2, which connects with the node 2 in FIG. 12. If a backup next hop is operational, the method flows to the node 5, which connects with the node 5 in FIG. 12.

Figure 12:
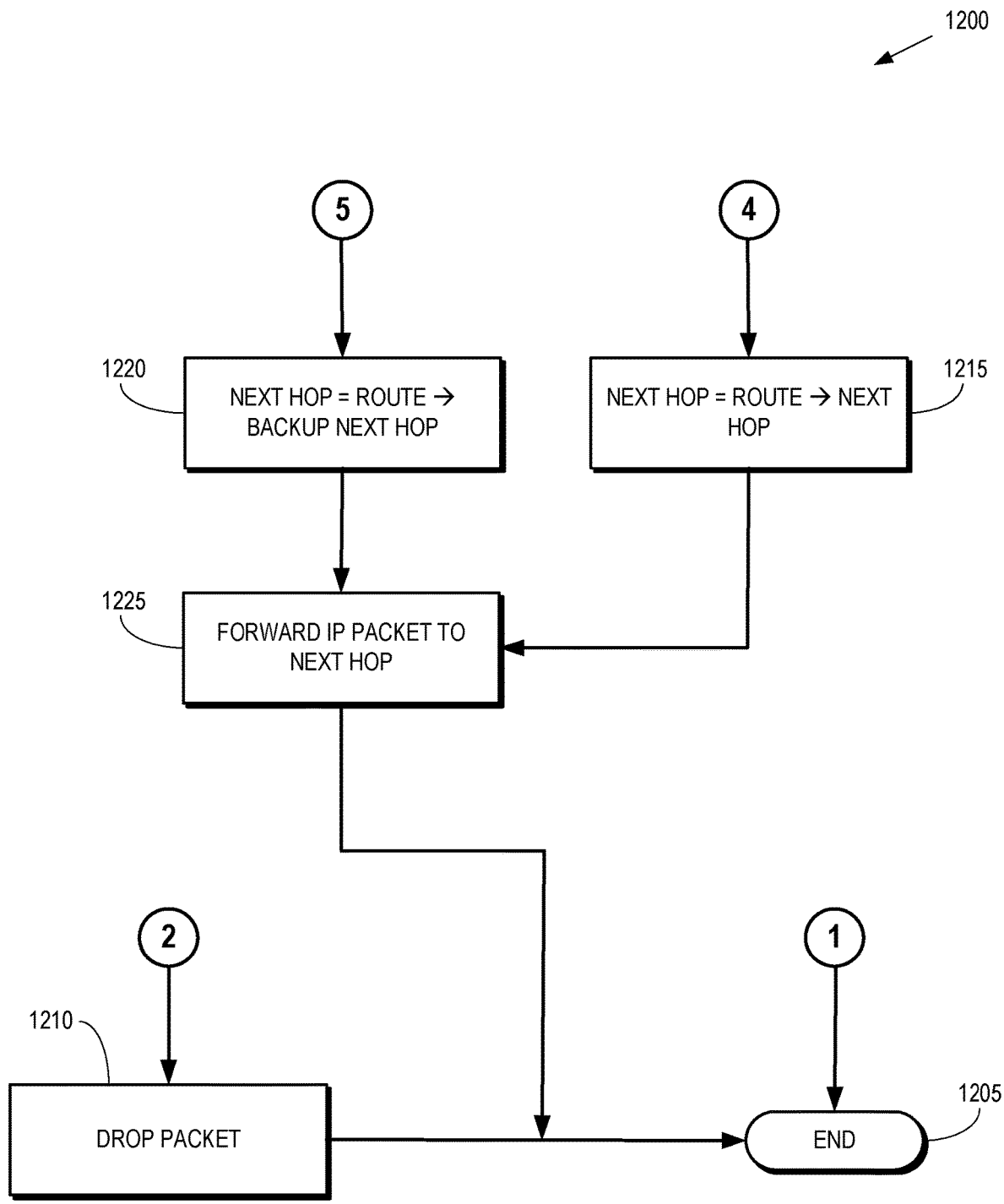
FIG. 12 is a flow diagram of a third portion of the method of originating and processing a U-turn indicator according to some embodiments.

FIG. 12 is a flow diagram of a third portion 1200 of the method of originating and processing a U-turn indicator according to some embodiments. The third portion 1200 of the method is implemented at the nodes in some embodiments of the communication systems 100, 200, 300, 400, 500 shown in FIGS. 1-5. Node 1 connects the block 1205 with the block 1035 in FIG. 10. Node 2 connects the decision block 1210 with the decision block 1040 in FIG. 10 and the decision block 1120 in FIG. 11. Node 3 connects the decision block 1105 with the decision block 1040 in FIG. 10. Node 4 connects the block 1215 with the decision blocks 1110, 1115 in FIG. 11. Node 5 connects the block 1220 with the decision block 1120 in FIG. 11.

At block 1210, the node drops the IP packet. In some embodiments, the node also performs related actions such as sending an error indication back to the source of the dropped packet. The method then flows to the node 1205 and the method ends.

At block 1215, the node sets the primary next hop as the next hop to forward the IP packet. The method then flows to the block 1225.

At block 1220, the node sets the backup next hop as the next hop to forward the IP packet. The method then flows to the block 1225.

At block 1225, the node forwards the IP packet to the next hop selected by the operations at block 1215 or at block 1220. In some embodiments, the node performs origination of a U-turn indicator in the IP packet, if required. The method then flows to the block 1205 and the method ends.

Figure 13:
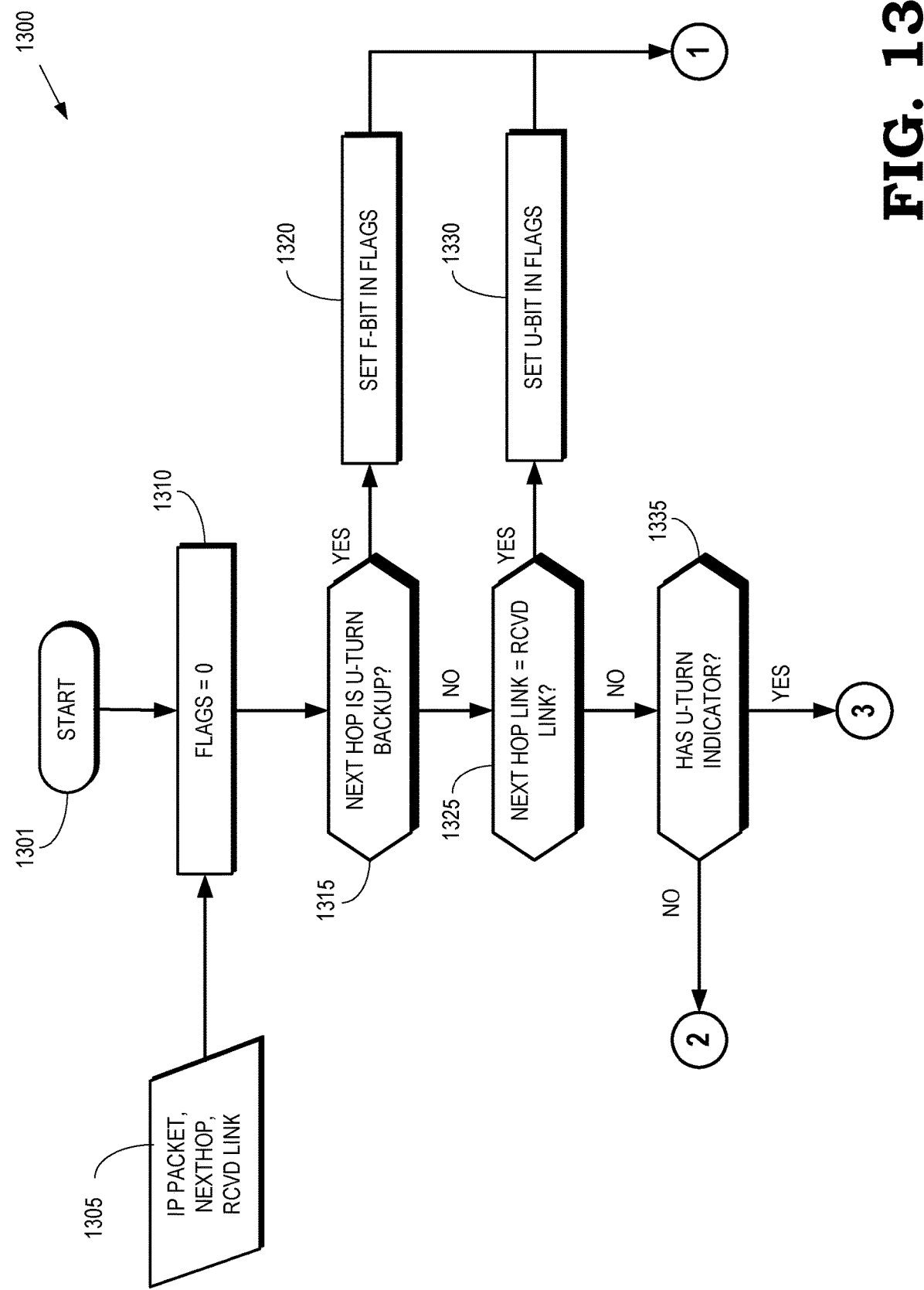
FIG. 13 is a flow diagram of a first portion of a method of forwarding an IP packet to a next hop according to some embodiments.

FIG. 13 is a flow diagram of a first portion 1300 of a method of forwarding an IP packet to a next hop according to some embodiments. The method is implemented at the nodes in some embodiments of the communication systems 100, 200, 300, 400, 500 shown in FIGS. 1-5. Some embodiments of the method are used to perform the operations in block 1225 shown in FIG. 12.

The method begins at block 1301. The method receives input 1305 including the IP packet that is to be forwarded by the node, the next hop on which to forward the IP packet, and the link/interface on which the IP packet arrived at the node.

At block 1310, the node initializes a local variable (Flags) that is used to set the flags for the U-turn indicator, if the flags are included in the U-turn indicator.

At decision block 1315, the node determines whether the next hop is marked as a U-turn backup next hop or a U-turn alternate next hop. If yes, the method flows to the block 1320. If the next hop is not marked as a U-turn backup/alternate next hop, the method flows to the decision block 1325.

At the block 1320, the node sets the F bit in the local variable Flags to indicate that the IP packet is forwarded on a U-turn alternate path. The method then flows to node 1, which connects to the node 1 in FIG. 14.

At decision block 1325, the node determines whether the next hop link is the same as the link on which the IP packet arrived at the node. If yes, the method flows to the block 1330. If the next hop link is not the same as the link on which the packet arrives, the method flows to the decision block 1335.

At block 1330, the node sets the U bit in the local variable Flags to indicate that the IP packet is making a U-turn at the node. The method then flows to node 1, which connects to the node 1 in FIG. 14

At decision block 1335, the node determines whether the IP packet already includes a U-turn indicator. If not, the method flows to the node 2, which connects to the node 2 in FIG. 14. If the IP packet already includes a U-turn indicator, the U-turn indicator should be passed on to the next hop. The method therefore flows to the node 3, which connects to the node 3 in FIG. 14.

Figure 14:
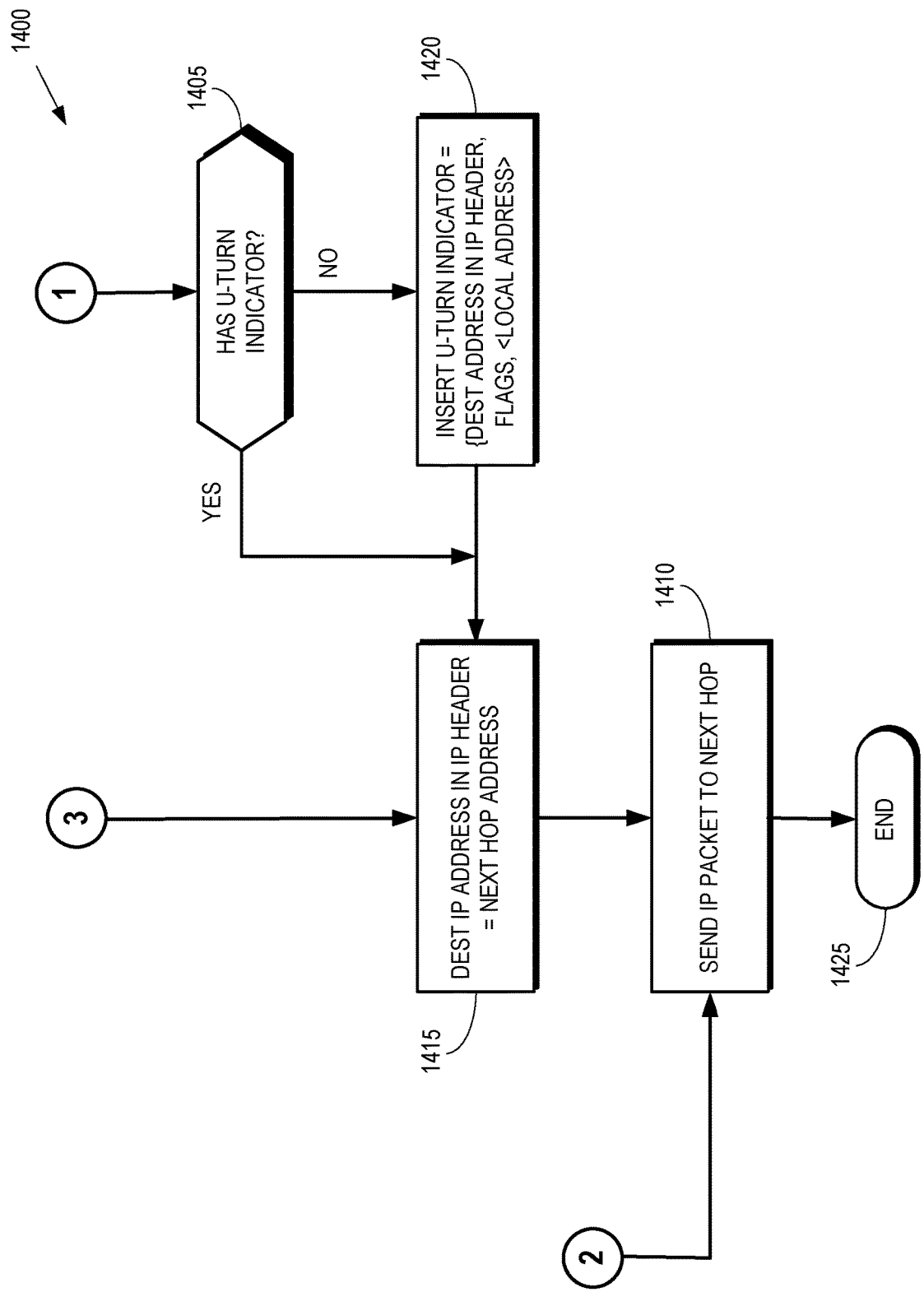
FIG. 14 is a flow diagram of a second portion of the method of forwarding the IP packet to a next hop according to some embodiments.

FIG. 14 is a flow diagram of a second portion 1400 of the method of forwarding the IP packet to a next hop according to some embodiments. The second portion 1100 of the method is implemented at the nodes in some embodiments of the communication systems 100, 200, 300, 400, 500 shown in FIGS. 1-5. Node 1 connects the decision block 1405 with the block 1320, 1330 in FIG. 13. Node 2 connects the block 1410 with the decision block 1335 in FIG. 13. Node 3 connects the block 1415 with the decision block 1335 in FIG. 13.

At decision block 1405, the node determines whether the IP packet already includes a U-turn indicator. If not, the method flows to the block 1420. If the IP packet includes a U-turn indicator, the method flows to the block 1415.

At the block 1420, the node inserts a U-turn indicator into the header of the IP packet. The node copies the destination address from the IP header of the received packet into the destination IP address field of the U-turn indicator. Some embodiments of the U-turn indicator also include the local Flags variable, the local address of the node as the originator IP address field in the U-turn indicator, or a combination thereof. The method then flows to block 1415.

At the block 1415, the node sets the destination address in the IP header as the address of the next hop because the IP packet includes a U-turn indicator. The method then flows to the block 1410.

At the block 1410, the node sends the IP packet to the next hop. The method then flows to the block 1425 and the method ends.

Figure 15:
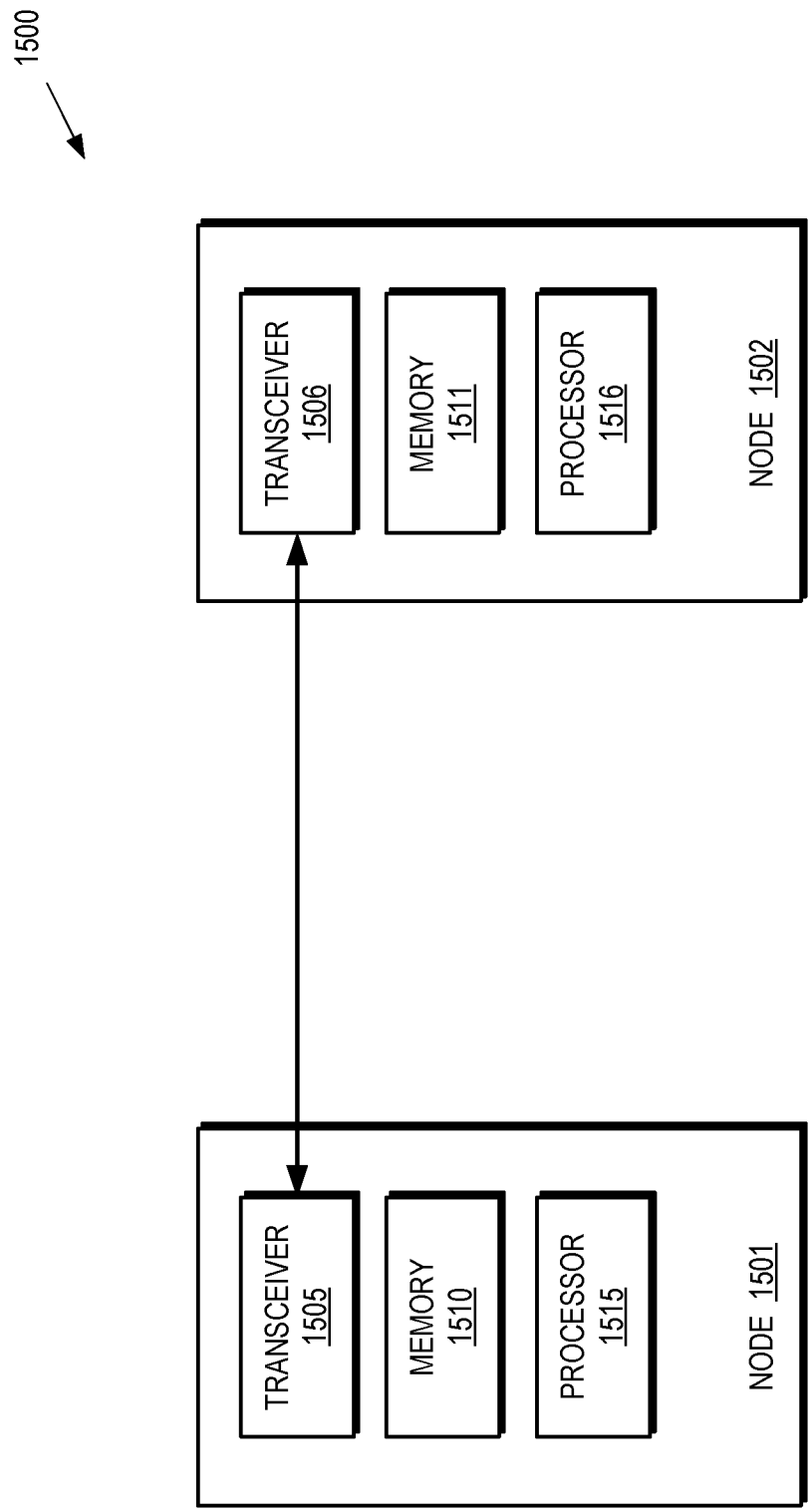
FIG. 15 is a block diagram of a communication system that implements U-turn alternate paths in packet rerouting according to some embodiments.

FIG. 15 is a block diagram of a communication system 1500 that implements U-turn alternate paths in packet rerouting according to some embodiments. The communication system 1500 includes nodes 1501 and 1502 that are used to implement some embodiments of the nodes in communication systems 100, 200, 300, 400, 500 shown in FIGS. 1-5. In the illustrated embodiment, the nodes 1501 and 1502 are implemented using transceivers 1505, 1506 to transmit and receive packets such as IP packets that are conveyed through the network, memories 1510, 1511 to store data and instructions, and processors 1515, 1516 to execute the instructions, e.g., by performing operations indicated by the instructions stored in the corresponding memory 1510, 1511 on the data stored in the corresponding memory 1510, 1511 and storing the results in the corresponding memory 1510, 1511. The nodes 1501 and 1502 are therefore able to implement some embodiments of the methods shown in FIGS. 10-14.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
   i. a combination of analog and/or digital hardware circuit(s) with software/firmware and
   ii. any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a node, an Internet Protocol (IP) packet intended for a destination node, wherein an IP header of the IP packet includes a destination address field that includes an address of the destination node;
determining, by the node based on a failure associated with a first path toward the destination node, to reroute the IP packet toward a backup next hop node associated with a second path toward the destination node;
modifying, by the node based on a determination that the second path is a U-turn path, the IP packet to form a modified IP packet by including a U-turn indicator in the IP header of the IP packet, including the address of the destination node in the U-turn indicator, and replacing the address of the destination node with an address of the backup next hop node in the destination address field; and
transmitting, from the node toward the backup next hop node via the second path, the modified IP packet.

2. The method of claim 1, wherein the U-turn indicator comprises a source address of the node which inserted the U-turn indicator into the IP packet.

3. The method of claim 1, wherein the U-turn indicator comprises at least one flag.

4. The method of claim 3, wherein the at least one flag comprises at least one of a first flag encoding an indication that the IP packet is being fast rerouted along an alternate path from the node to the destination node, a second flag encoding an indication that the IP packet previously performed a U-turn, or a third flag encoding information indicating that a source address of the node which inserted the U-turn indicator into the IP packet is included in the U-turn indicator.

5. The method of claim 1, wherein the determination that the second path is a U-turn path is based on an entry in a routing table at the node.

6. An apparatus, comprising:
at least one processor;
at least one memory storing instructions that, when executed by the at least one processor, cause the apparatus to at least:
receive, at a node, an Internet Protocol (IP) packet intended for a destination node, wherein an IP header of the IP packet includes a destination address field that includes an address of the destination node;
determine, by the node based on a failure associated with a first path toward the destination node, to reroute the IP packet toward a backup next hop node associated with a second path toward the destination node;
modify, by the node based on a determination that the second path is a U-turn path, the IP packet to form a modified IP packet by including a U-turn indicator in the IP header of the IP packet, including the address of the destination node in the U-turn indicator, and replacing the address of the destination node with an address of the backup next hop node in the destination address field; and
transmit, from the node toward the backup next hop node via the second path, the modified IP packet.

7. The apparatus of claim 6, wherein the U-turn indicator comprises a source address of the node which inserted the U-turn indicator into the IP packet.

8. The apparatus of claim 6, wherein the U-turn indicator comprises at least one flag.

9. The apparatus of claim 6, wherein the at least one flag comprises at least one of a first flag encoding an indication that the IP packet is being fast rerouted along an alternate path from the node to the destination node, a second flag encoding an indication that the IP packet previously performed a U-turn, or a third flag encoding information indicating that a source address of the node which inserted the U-turn indicator into the IP packet is included in the U-turn indicator.

10. The apparatus of claim 6, wherein the determination that the second path is a U-turn path is based on an entry in a routing table at the node.

11. An apparatus, comprising:
at least one processor;
at least one memory storing instructions that, when executed by the at least one processor, cause the apparatus to at least:
receive, at a node, an Internet Protocol (IP) packet intended for a destination node, wherein the IP packet includes an IP header, wherein the IP header includes a destination address field and a U-turn indicator, wherein the destination address field includes an address of the node, wherein the U-turn indicator includes an address of the destination node;
perform, at the node based on a determination that the destination address field includes the address of the node and based on a determination that the IP header includes the U-turn indicator, a lookup for a primary path for the IP packet based on the address of the destination node in the U-turn indicator;
identify, by the node based on a determination that the primary path for the IP packet is a U-turn path for the IP packet, a second path from the node toward the destination node; and
forward, by the node along the second path from the node toward the destination node, the IP packet.

12. The apparatus of claim 11, wherein the second path is a loop-free alternate path.

13. The apparatus of claim 11, wherein the second path is a back-up U-turn path.

14. The apparatus of claim 11, wherein the U-turn indicator comprises a source address of a node which inserted the U-turn indicator into the IP packet.

15. The apparatus of claim 11, wherein the U-turn indicator comprises at least one flag.

16. The apparatus of claim 15, wherein the at least one flag comprises at least one of a first flag encoding an indication that the IP packet is being fast rerouted along an alternate path from the node to the destination node, a second flag encoding an indication that the IP packet previously performed a U-turn, or a third flag encoding information indicating that a source address of a node which inserted the U-turn indicator into the IP packet is included in the U-turn indicator.

17. A method comprising:
receiving, at a node, an Internet Protocol (IP) packet intended for a destination node, wherein the IP packet includes an IP header, wherein the IP header includes a destination address field and a U-turn indicator, wherein the destination address field includes an address of the node, wherein the U-turn indicator includes an address of the destination node;

performing, at the node based on a determination that the destination address field includes the address of the node and based on a determination that the IP header includes the U-turn indicator, a lookup for a primary path for the IP packet based on the address of the destination node in the U-turn indicator;

identifying, by the node based on a determination that the primary path for the IP packet is a U-turn path for the IP packet, a second path from the node toward the destination node; and forwarding, by the node along the second path from the node toward the destination node, the IP packet.

18. The method of claim 17, wherein the second path is a loop-free alternate path.

19. The method of claim 17, wherein the second path is a back-up U-turn path.

20. The method of claim 17, wherein the U-turn indicator comprises a source address of a node which inserted the U-turn indicator into the IP packet.

21. The method of claim 17, wherein the U-turn indicator comprises at least one flag.

22. The method of claim 21, wherein the at least one flag comprises at least one of a first flag encoding an indication that the IP packet is being fast rerouted along an alternate path from the node to the destination node, a second flag encoding an indication that the IP packet previously performed a U-turn, or a third flag encoding information indicating that a source address of a node which inserted the U-turn indicator into the IP packet is included in the U-turn indicator.

* * * * *